United States Patent
Ross et al.

(10) Patent No.: US 9,965,543 B1
(45) Date of Patent: May 8, 2018

(54) SYSTEMS AND METHODS FOR DATABASE RECORD CLUSTERING

(71) Applicant: Massachusetts Mutual Life Insurance Company, Springfield, MA (US)

(72) Inventors: Gareth Ross, Amherst, MA (US); Yaron Ben-Zvi, Hastings on Hudson, NY (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 231 days.

(21) Appl. No.: 15/134,656

(22) Filed: Apr. 21, 2016

Related U.S. Application Data

(60) Provisional application No. 62/150,608, filed on Apr. 21, 2015.

(51) Int. Cl.
*G06F 17/30* (2006.01)
(52) U.S. Cl.
CPC .. *G06F 17/30598* (2013.01); *G06F 17/30106* (2013.01); *G06F 17/30864* (2013.01)

(58) Field of Classification Search
USPC ............... 707/607, 608, 687, 790, 813, 953
See application file for complete search history.

(56) References Cited

U.S. PATENT DOCUMENTS

| 6,850,252 B1* | 2/2005 | Hoffberg | G06K 9/00369 348/E7.061 |
| 9,256,761 B1* | 2/2016 | Sahu | G06F 21/6218 |
| 2003/0067554 A1* | 4/2003 | Klarfeld | G11B 27/105 348/461 |
| 2014/0201126 A1* | 7/2014 | Zadeh | G06K 9/627 706/52 |

\* cited by examiner

*Primary Examiner* — Sana A Al-Hashemi
(74) *Attorney, Agent, or Firm* — Eric L. Sophir; Dentons US LLP

(57) ABSTRACT

A system and method for clustering client records together is disclosed. The system may include statistical models based on characteristics of a record cluster stored in a database. The statistical models may be compared against characteristics of records in a data source in order to cluster the records into different categories. The cluster of records by category may then be output to a computer system in order to send electronic messages.

8 Claims, 4 Drawing Sheets

SYSTEMS AND METHODS FOR DATABASE RECORD CLUSTERING

CROSS-REFERENCE TO RELATED APPLICATIONS

This application claims a benefit of priority to U.S. Provisional Patent Application Ser. No. 62/150,608, filed on Apr. 21, 2015, which is herein fully incorporated by reference for all purposes.

TECHNICAL FIELD

Generally, the present disclosure relates to databases. More specifically, the present disclosure related to record clustering.

BACKGROUND

A database stores a set of records. However, managing such records may be difficult due to record number, size, content, or relationships. For example, there may be a need to group records into different sets and use such sets to perform various set-specific computing operations. Thus, a need exists for a technology to cluster database records into different sets in order to execute set-specific computing operations.

SUMMARY

In one embodiment, a method of data clustering is provided. The method comprises: serving, by a server, over a network, a graphical user interface in an application running on an operating system of a client, wherein the graphical user interface comprises a first graphical element configured to receive a category datum and a second graphical element configured to trigger a submission of the category datum from the client to the server over the network; in response to the submission via the second graphical element: accessing, by the server, a first database storing a first file, a plurality of first records, and a plurality of second records, wherein the first file comprises a statistical model associated with the category datum, wherein each of the first records comprises a first unique identifier, a first set of personal information for a first user, and a first set of contact information for the first user, wherein each of the second records comprises a second unique identifier and a second file comprising a plurality of formatted paragraphs; searching, by the server, the first database for a third unique identifier, wherein the third unique identifier is associated with the category datum, a record of the first records via the first unique identifier, and a record of the second records via the second unique identifier; in response to locating, by the server, based on the searching, the third unique identifier: accessing, by the server, the record of the first records; copying, by the server, the first set of contact information; serving, by the server, over the network, based on the copying, the first set of contact information to the graphical user interface such that the client is able to generate a first message to the first user based on the first set of contact information; in response to not locating, by the server, based on the searching, the third unique identifier: accessing, by the server, a second database storing a plurality of third records, wherein each of the third records comprises a second set of personal information for a second user and a second set of contact information for the second user; identifying, by the server, a record of the third records; copying, by the server, at least a portion of the record of the third records; accessing, by the server, the first file; comparing, by the server, the portion against the statistical model; in response to determining, by the server, based on the comparing, that the record of the third records is associated with the category datum, generating, by the server, a fourth unique identifier and a fifth unique identifier in the first database; copying, by the server, the record of the third records from the second database to the first database; assigning, by the server, the record of the third records to the fourth unique identifier in the first database; assigning, by the server, the fourth unique identifier and the second unique identifier to the fifth unique identifier; copying, by the server, the second set of contact information; serving, by the server, over the network, based on the copying, the second set of contact information to the graphical user interface such that the client is able to generate a second message to the second user based on the second set of contact information.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
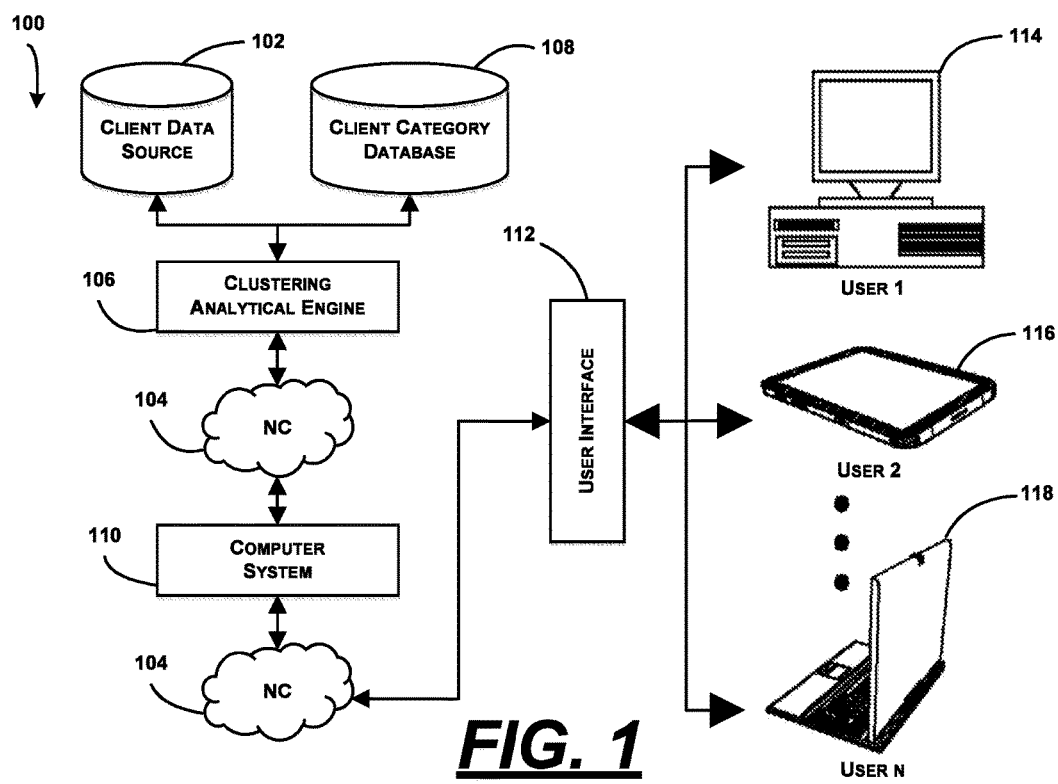
FIG. 1 is a block diagram of an illustrative system architecture for a record clustering system, according to an embodiment.

The present disclosure is herein described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

In some embodiments, managing a set of client records in a database may become difficult due to record number, size, content, or relationships. Therefore, a computer-implemented client record clustering system operates in a system architecture that includes different components that dynamically interact with each other through network connections.

For example, such system can include one or more client category databases, one or more client data sources, one or more client computing devices, one or more servers, and one or more of the following software modules: a clustering analytical engine, and a computer system, among other components. A client category database may include statistical models built using statistical classification or unsupervised learning techniques with client data. The statistical models may be used to identify and cluster client records by category. For example, the clustering analytical engine may crawl through a client data source and compare each client record data against analytical models stored in the client category database. At each record compared, a determination is made by the clustering analytical engine to identify if the client record belongs to the specific category that the statistical model may represent. Whenever a client record is determined to belong to a specific category, the client record may be clustered with other client records that also belong to the same category. Client data and category data may be stored in the client category database. The system may further include a computer system, which may include programmatic rules or logic to manage and execute client record specific computing operations, such as email campaigns. The computer system may request, from the clustering analytical engine, a client identifier list clustered by a specific category in order to develop and execute client record specific computing operations, such as email campaigns targeted based on the requested category of client records.

For example, a system and method may include storing at least one set of clustered client records. Each record set may be organized by a respective category inclusive of features associated with client records in respective sets of clustered client records. A first query inclusive of a search category may be received. The set(s) of clustered clients to determine if a set of clustered client records matches the search category may be searched. If a determination is made that a set of clustered client records organized by a category that matches the search category exists, the matching set of clustered client records may be selected. Otherwise, if a determination is made that no sets of clustered client records are organized by a category that matches the search category, (i) a client data source may be caused to be crawled for client records associated with at least one feature of the search category, and (ii) a new set of clustered client records associated with at least one feature of the search category may be formed. The selected matching set or new set of clustered client records may be communicated in response to receiving the first query.

As used herein, the following terms may have the following definitions:

"Clustering" refers to grouping, into categories, clients sharing trends that are more similar to each other than to other groups.

System Components and Architecture

FIG. 1 is a block diagram illustrating an illustrative system architecture 100 for a client record clustering system. The system architecture 100 includes one or more components, such as, client data sources 102, network communication 104, clustering analytical engine 106, client category database 108, computer system 110, user interface 112 and client computing devices 114, 116, 118.

Network communication 104 is operatively coupled to and in bi-directional communication with the clustering analytical engine 106 and the computer system 110. The clustering analytical engine 106 is operatively coupled to and in bi-directional communication with client category database 108 and client data sources 102.

The different components of system architecture 100 may be implemented in any type of processor-controlled device that receives, processes, and/or transmits digital data, configured as further described below. Examples of devices incorporating one or more processor-controlled devices include smartphones, desktop computers, laptop computers, servers, tablets, PDAs, and the like.

Examples of client computing device 114, 116, and 118, includes smartphones, desktop computers, laptop computers, servers, tablets, PDAs, and/or another type of processor-controlled device that receives, processes, and/or transmits digital data.

Client data source 102 and client category database 108 may be databases implemented in database management systems (DBMS) such as, MySQL, Postgre SQL, SQLite, Microsoft SQL Server, Microsoft Access, Oracle, SAP, dBASE, FoxPro, IBM DB2, LibreOffice Base, FileMaker Pro and/or any other type of database that may organize collections of data. For example, the database may be relational, such as primary key driven, or a post-relational or in-memory. For example, when a record comprises a primary key, such as a unique identifier, then that record can be clustered in a set or sub-clustered into a sub-set based on the unique identifier, where each of the set or the sub-set is also associated with a unique identifier specifically generated for that set or sub-set. Note that although each of the records in a database can be a line comprising a with a plurality of columns, other ways of organizing records can be used, such as non-structured data.

The client data source 102 may store general information regarding clients. Examples of the client data source 102 may include, but are not limited, to a customer relationship management system (CRM). In another embodiment, the client data source 102 may also include social media sites or web sites from where information related to the client records may be derived such as, interests, tastes, hobbies, or others.

Network communications 104 may include any connection between computing devices, such as intranets, local area networks (LAN), virtual private networks (VPN), wireless area networks (WAN), and the Internet, among others.

The clustering analytical engine 106 may be a software module or any other programmatic logic, conditions or rules to identify a list of clusters for client records, as well as characteristics of members for each cluster from a client data source 102. The clustering analytical engine 106 stores statistical models based on the identified clusters of client records and characteristics of their members in a client category database 108.

The clustering analytical engine 106 may output a list of the clustered client records into a computer system 110. Client records may be clustered using different content criteria, such as products receipts, demographics, health conditions, common interests, or others. The computer system 110 may comprise a software module implemented in computing device(s), which may include software tools to manage, plan, and dispatch cluster-specific operations, such as email campaigns, for the different clustered client record groups. In another embodiment, the computer system 110 may also be an automated system that may automatically execute email campaigns. For example, the computer system 110 may automatically send emails to a specific client address or cluster of client addresses and include promotional content based on content for that client record or cluster of client records. Other examples of automatic operations that the computer system 110 may dispatch include, automatic calling and/or targeted multimedia content presentation over a social media service.

In some embodiments, the client record clustering system may display a user interface 112 on client computing devices. Through the client computing devices, a user may create, design, manage and deploy email campaign efforts.

An authorized user may interact with user interface 112 via an input device, such as, a touch screen, a mouse, a keyboard, a keypad, and the like. For example, the user interface 112 can be server-served, such as in a browser, or server-populated, such as in a mobile app. The user interface 112 can comprise various graphical elements, such as data entry fields, dropdown menus, or buttons or links to activate submission of the data entry fields from a client displaying the user interface 112 to a server.

Figure 2:
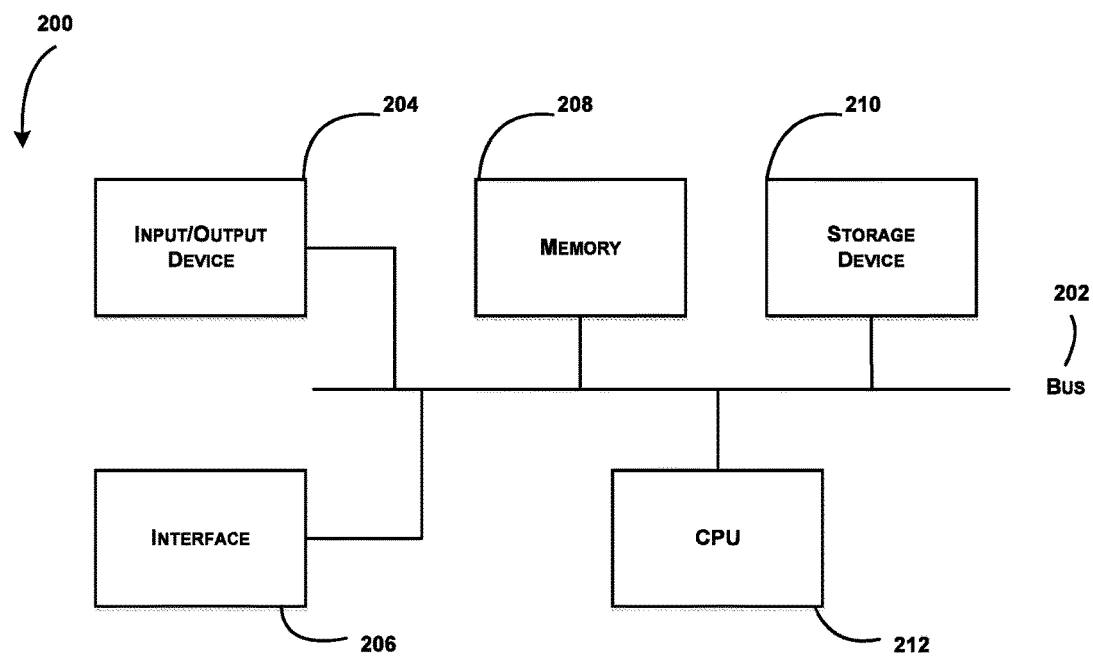
FIG. 2 is a block diagram of example components in a computing device, in which one or more embodiments of the present disclosure may operate, according to an embodiment.

FIG. 2 is an illustration of an illustrative computing device 200 in which one or more embodiments of the present disclosure may operate, according to an embodiment. In one embodiment, computing device 200 includes bus 202, input/output (I/O) device 204, communication interface 206, memory 208, storage device 210 and central processing unit 212. In another embodiment, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other. Examples of (I/O) device 204 include peripherals and/or other mechanisms that may enable a user to input information to computing device 200, including a keyboard, computer mice, buttons, touch screens, voice recognition, and biometric mechanisms, and the like. (I/O) device 204 also includes a mechanism that outputs information to the user of computing device 200, such as a display, a light emitting diode (LED), a printer, a speaker, and the like.

Examples of communication interface 206 include mechanisms that enable computing device 200 to communicate with other computing devices and/or systems through network connections. Examples of network connections include any connections between computers, such as intranets, local area networks (LANs), virtual private networks (VPNs), wide area networks (WANs), the Internet, and the like. Examples of memory 208 include random access memory (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of computer system 110, clustering analytical engine 106, client category database 108, client data source 102, and client computing devices 114, 116, 118 and the like. Examples of these implementations include servers, authorized computing devices, smartphones, desktop computers, laptop computers, tablet computers, a PDAs, another type of processor-controlled device that may receive, process, transmit digital data, and the like. Additionally, computing device 200 may perform certain operations that are required for the proper operation of system architecture 100. Computing devices 200 may perform these operations in response to central processing unit 212 executing software instructions contained in a computer-readable medium, such as memory 208.

In one embodiment, the software instructions of system are read into memory 208 from another memory location, such as storage device 210, or from another computing device 200 (e.g., computer system 110, clustering analytical engine 106, client category database 108, client data source 102, and the like) via communication interface 206. In this embodiment, the software instructions contained within memory 208 instruct central processing unit 212 to perform processes that will be described in FIGS. 3 and 4, below. Alternatively, hardwired circuitry may be used in place of or in combination with software instructions to implement processes described herein. Thus, implementations described herein are not limited to any specific combination of hardware circuitry and software.

Figure 3:
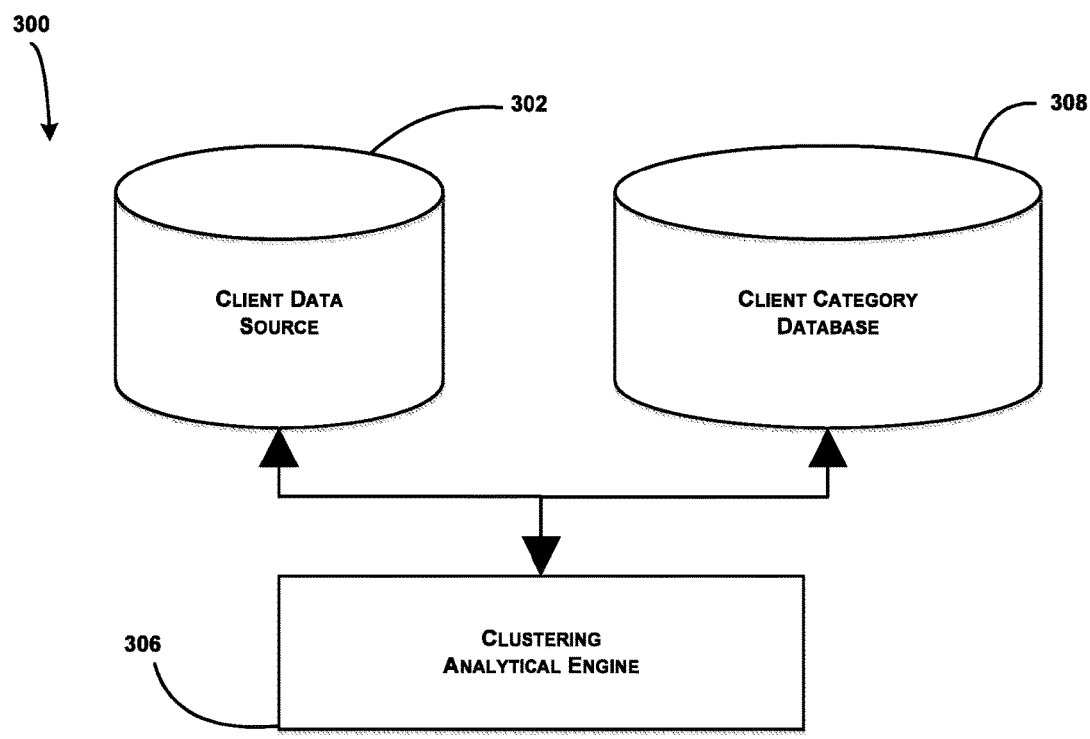
FIG. 3 is a block diagram of an illustrative portion of system architecture pertaining to an clustering analytical engine, according to an embodiment.

FIG. 3 is a block diagram of an illustrative subsystem of an client record clustering system 300. In FIG. 3, subsystem 300 includes client data source 302, client category database 308, and clustering analytical engine 306. It should be understood that the client clustering and system 300 can include fewer components, more components, or different components depending on the desired analysis goals. In an example and referring to FIG. 1, the clustering analytical engine 306 is implemented as clustering analytical engine 106 in system architecture 100. In FIG. 3, clustering analytical engine 306 is operatively coupled to and in communication with the client data source 302 and client category database 308.

In some embodiments, clustering analytical engine 306 may be a software module or other programmatic logic configured to run on computing devices, such as desktop computers, laptop computers and server computers, among others. Clustering analytical engine 306 may include programmatic logic, conditions or rules to identify a list of clusters of client records, as well as characteristics of members for each cluster record from a client data source 302. Examples of characteristics that may define if a client record belongs to a certain cluster include: demographics; health features, such as, age, gender, height and health habits or conditions; receipt data informative of a type of product previously obtained; things of interest to the client based on content of the client record; and/or any informational meta-data stored in a client record in a data source.

Clustering analytical engine 306 stores statistical models based on the identified clusters of client records and characteristics of their members in a client category database 308. A statistical model defines the list of characteristics or attributes that a client record must have in order to belong to a specific record cluster. Statistical models are built using statistical classification and unsupervised machine learning algorithms.

Clustering analytical engine 306 may crawl through a client data source 302 and compare the information pertaining to each client record against the statistical models stored in client category database 308 in order to assign the client record to a cluster record.

Method for Clustering Client Records by Category

A plurality of methods implemented by the client clustering and system are performed by one or more computing devices, such as computing device 200. The methods are implemented with components of the exemplary operating environments of FIGS. 1-3. The steps of this illustrative method are embodied in a computer readable medium containing a computer readable code such that the steps are implemented when the computer readable code is executed by a computing device. While the blocks in the disclosed process are shown in a particular order, the actual order may differ. In some embodiments, some steps may be performed in parallel.

Figure 4:
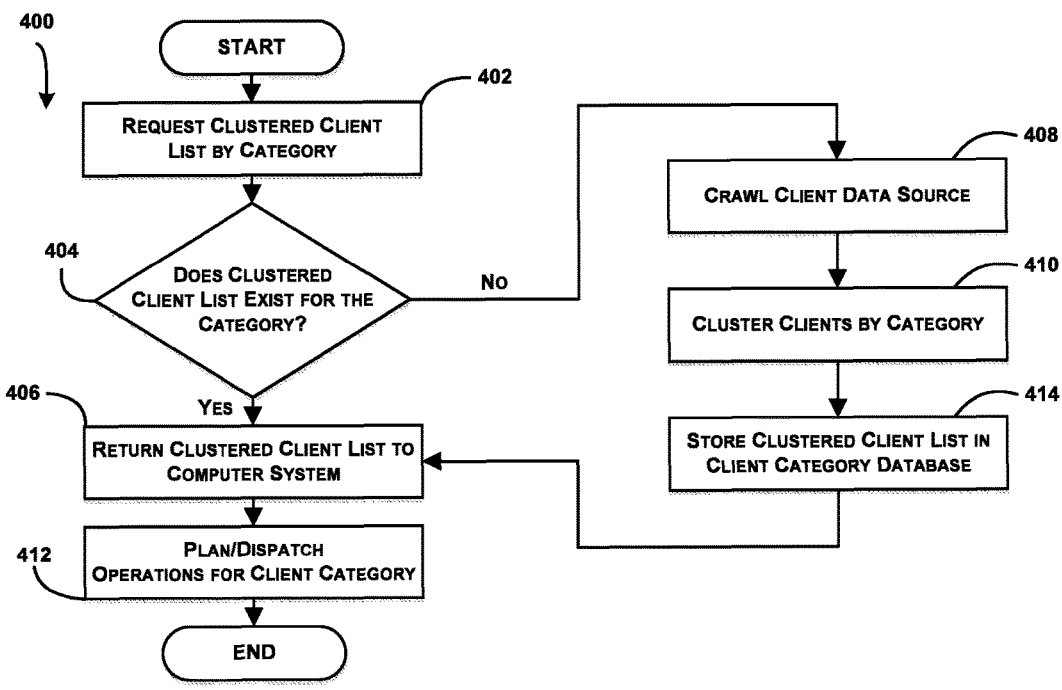
FIG. 4 is a flow diagram of an illustrative process for identifying a cluster of records by a category in order to execute cluster-specific computing operations, according to an embodiment.

FIG. 4 is a flow diagram illustrating an illustrative process for identifying a cluster of client records in order to plan or perform an email campaign. In FIG. 4, process 400 begins when a user makes a request through user interface 112 of computer system 110 for a clustered client record list (step 402). The request may include a specific category by which the client records may be clustered. The different categories by which client records may be clustered are defined by features that the client records may have in common as determined via record content, such as demographics, health features, such as age, gender, height and health habits or conditions; receipt file informative of a type of product previously obtained; things of interest to the client as obtained via record content; and/or any informational metadata stored in a client record in a data source. In an example embodiment, at step 402 a user of the system may request a list of client records that share a specific common feature, such as an interest in a particular type of music or sport, such as music genre datum contained in a record. A processor within the clustering analytical engine 106 may run a set of rules or conditional logic programmed into the engine in order to determine if a clustered client record list already exists for the category requested (step 404). If a list exists, the list is returned to the computer system (step 406). Continuing the example embodiment, if a list exists for client records that share content informative of the common interest in the music or sport requested, the list is returned to the computer system at step 406. The computer system may then display the list to the user and enable a user to plan or dispatch emails based on the list of client records returned (step 412).

In step 404, if a determination is made that a list does not exist for the client category requested, the clustering analytical engine may then crawl the contents of a client data source (step 408). In the example embodiment, if a determination is made that a list does not exist for client records that based on record content share the common interest in the music or sport requested, the clustering analytical engine may crawl the contents of a client data source in order to identify client records that based on content share interests in the music or sports requested. The clustering analytical engine may compare each client record stored in the client data source against statistical models for the category that has been requested in order to determine if the client record belongs to the category. The clustering analytical engine may then cluster all client records found that belong to the category (step 410) together into a new category list. The clustering analytical engine may then store the clustered client record list in the client category database (step 414). Once the clustered client record list is determined and stored, the list may be returned to the computer system (step 406). The computer system may then enable a user to plan or dispatch emails or other messages based on the list of clients returned (step 412).

The processes described herein may be executed through one or more computing devices of the system described in FIG. 1, thereby enabling the application of client record clustering a more efficient and faster processing of larger data sets. Client record clustering system allows an operator to group or segment record into different clusters using an automated and faster and more efficient method than possible with human-intervention data-driven analysis. In this way, efficiencies are created by providing the operator with ways to reduce searching and various other computation resources.

Example

An example using the principles of FIG. 4 includes an embodiment where a user uses a computer system to plan an email campaign. The user may access the computer system and determine that a set of criteria for the email campaign based on client records which contain content informative of having performed specific transactions, such as previously received service products as recited in a document comprising a plurality of formatted paragraphs, where the document is stored in a database as disclosed herein.

The user through the computer system may send a request to an clustering analytical engine for a list of client records that belong to a category of service products. The clustering analytical engine may query a client category database in order to determine if a list of client records belonging to the service products category has been previously stored, such as the service records comprising the documents with the formatted paragraphs, where the service records corresponding to the client records based on a unique identifier, such as a primary key.

In one embodiment, the system may determine that a list does not exist and, therefore, the clustering analytical engine may crawl through the client records of a client data source in order to extract members of the service products category. The clustering analytical engine may compare each record in the client data source to a statistical model for that category in order to determine if the client record is a member of that category. Statistical models for the service products category may have been previously determined and stored in the client category database or any memory storage coupled to the clustering analytical engine. The clustering analytical engine may then store a list of all client records found that may be members of the service products category, cluster them, and store the list in the client category database. The list may also be returned to the computer system where the list may be displayed to the user for email planning or execution.

The user may then further design an email or message campaign to be implemented through a broadcast medium, such as radio stations. The user through the computer system may send a request to a clustering analytical engine in order to further cluster the list of member records of the service products category previously returned, by a specific genre of music data.

The clustering analytical engine may crawl through the client records of a client data source, such as a social media web site in order to identify member records that have settings or characters informative of a liking of the genre of music. The clustering analytical engine may compare metadata in the client data source to a statistical model for that music genre in order to determine if the client record contains content indicative of the liking of the music genre. Statistical models for the music genre category may have been previously determined and stored in the client category database or any memory storage coupled to the clustering analytical engine.

The clustering analytical engine may then store a list of all client records found that may be members of the requested genre music category, cluster them, and store the list in the client category database. The list may also be returned to the computer system, where the list may be displayed to the user for email planning or execution. After the client records in the disability products category have been further clustered into different music genres, the user can identify the music genre that would be appealing to the highest number of clients based on respective client records. The agent may then select the most appropriate radio station identifier on which to implement the email or communication campaign. The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

One embodiment of a system and method may include storing at least one set of clustered client records. Each set may be organized by a respective category inclusive of features associated with client records in respective sets of clustered client records. A first query inclusive of a search category may be received. The set(s) of clustered client records to determine if a set of clustered clients matches the search category may be searched. If a determination is made that a set of clustered client records organized by a category that matches the search category exists, the matching set of clustered client records may be selected. Otherwise, if a determination is made that no sets of clustered client records are organized by a category that matches the search category, (i) a client data source may be caused to be crawled for client records associated with at least one feature of the search category, and (ii) a new set of clustered client records associated with at least one feature of the search category may be formed. The selected matching set or new set of clustered client records may be communicated in response to receiving the first query.

Communicating the selected matching set of clustered client records includes communicating the selected matching set or new set of clustered client records to a network address of a computer system configured to conduct an email or communication campaign. The features include a service product type identifier corresponding to the clients in the set(s) of clustered client records. Receiving the query may include receiving a query inclusive of a service product type and another feature of a category. In one embodiment, the client data source is a data source externally operated via a communications network. The client data source may be a social media service or network. The features may include health conditions data and any other metadata in an embodiment. A statistical model that defines a list of attributes that each client record in a cluster of client records includes to be in the cluster may be generated.

The process may further include receiving a second query inclusive of a second category. The set(s) of clustered client records may be searched to determine if a second set of clustered client records matches the search category and second search category. If a determination is made that a second set of clustered client records organized by a category and second category that matches the category and second category exists, the matching second set of clustered client records may be selected. Otherwise, if a determination is made that no sets of clustered client records are organized by a category and second category that matches the search category and second category, the process may (i) cause a client data source to be crawled for client records associated with at least one feature of the second search category, and (ii) form a new second set of clustered client records associated with at least one feature of the category and second category. The selected second or new second set of clustered client records may be communicated in response to receiving the second query. The process may further be configured to cause an email campaign to be executed in a communications channel associated with the at least one feature of the client records in the selected second set of clustered records or new set of clustered client records.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method of data clustering, the method comprising:
   serving, by a server, over a network, a graphical user interface in an application running on an operating system of a client, wherein the graphical user interface comprises a first graphical element configured to receive a category datum and a second graphical element configured to trigger a submission of the category datum from the client to the server over the network;
   in response to the submission via the second graphical element:
     accessing, by the server, a first database storing a first file, a plurality of first records, and a plurality of second records, wherein the first file comprises a statistical model is configured to identify cluster client records by category and associated with the category datum, wherein each of the first records comprises a first unique identifier, a first set of personal information for a first user, and a first set of contact information for the first user, wherein each of the second records comprises a second unique identifier and a second file comprising a plurality of formatted paragraphs;
   searching, by the server, the first database for a third unique identifier, wherein the third unique identifier is associated with the category datum, a record of the first records via the first unique identifier, and a record of the second records via the second unique identifier;
   in response to locating, by the server, based on the searching, the third unique identifier: accessing, by the server, the record of the first records; copying, by the server, the first set of contact information;
   serving, by the server, over the network, based on the copying, the first set of contact information to the graphical user interface such that the client is able to generate a first message to the first user based on the first set of contact information;
   in response to not locating, by the server, based on the searching, the third unique identifier:
     accessing, by the server, a second database storing a plurality of third records, wherein each of the third records comprises a second set of personal information for a second user and a second set of contact information for the second user;
   identifying, by the server, a record of the third records;
   copying, by the server, at least a portion of the record of the third records;
   accessing, by the server, the first file;
   comparing, by the server, the portion against the statistical model; in response to determining, by the server, based on the comparing, that the record of the third records is associated with the category datum, in the first database; to the first database; generating, by the server, a fourth unique identifier and a fifth unique identifier copying, by the server, the record of the third records from the second database assigning, by the server, the record of the third records to the fourth unique identifier in the first database;
   assigning, by the server, the fourth unique identifier and the second unique identifier to the fifth unique identifier;
   copying, by the server, the second set of contact information; serving, by the server, over the network, based on the copying, the second set of contact information to the graphical user interface such that the client is able to generate a second message to the second user based on the second set of contact information.

2. The method of claim 1, further comprising:
   configuring, by the server, the first database such that the fifth unique identifier is locatable when searching for the third unique identifier.

3. The method of claim 1, wherein each of the first records associated with the third unique identifier and the third records associated with the fourth unique identifier in the first database comprises a first music genre datum, wherein the first database stores a list of music source identifiers, wherein each of the music source identifiers comprises a second music genre datum and a music source address datum, and further comprising:
   for each of the first records associated with the third unique identifier and the third records associated with the fourth unique identifier:
     determining, by the server, if there is a match between the first music genre datum and the second music genre datum;
     in response to the match:
       generating, by the server, a sixth unique identifier in the first database, wherein the sixth unique identifier is associated with the first music genre datum and the second music genre datum;
       assigning, by the server, the first records associated with the third unique identifier and the third records associated with the fourth unique identifier corresponding to the match to the sixth identifier; copying, by the server, the first second of contact information and the second set of contact information corresponding to the match;
       serving, by the server, over the network, based on the copying, the first second of contact information and the second set of contact information corresponding to the match to the graphical user interface, wherein at least one of the first message or the second message is addressed based on the music source address datum based on the match.

4. The method of claim 3, wherein the statistical model comprises the music source identifiers.

5. The method of claim 1, wherein the network is a wide area network, wherein the server is a first server, wherein the first database is hosted on a second server, wherein the second database is hosted on a third server.

6. The method of claim 1, wherein the network is a local area network, wherein the server is a first server, wherein the first database is hosted on a second server, wherein the second database is hosted on a third server.

7. The method of claim 1, wherein the second database stored a plurality of social network service profiles, wherein each of the third records comprises each of the social network service profiles.

8. The method of claim 1, wherein the server is a first server, wherein the second database feeds information to a customer relationship management application running on a second server, wherein the second server hosts the second database.

* * * * *